(12) United States Patent  (10) Patent No.: US 8,349,155 B2
Umemura et al.  (45) Date of Patent: Jan. 8, 2013

(54) CATION EXCHANGE MEMBRANE, PRODUCTION PROCESS THEREOF AND ELECTROLYTIC CELL USING THE SAME

(75) Inventors: Kazuo Umemura, Tokyo (JP); Hiromitsu Kusano, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/193,197

(22) Filed: Jul. 28, 2011

(65) Prior Publication Data

US 2011/0278159 A1  Nov. 17, 2011

Related U.S. Application Data

(63) Continuation of application No. PCT/JP2010/052649, filed on Feb. 22, 2010.

(30) Foreign Application Priority Data

Feb. 23, 2009  (JP) .................................. 2009-039147

(51) Int. Cl.
*C25B 1/46*  (2006.01)
*C25B 13/00*  (2006.01)
*C25B 13/08*  (2006.01)
*B29C 47/06*  (2006.01)

(52) U.S. Cl. ........ 204/296; 204/295; 204/252; 205/517; 205/521; 425/113; 425/133.5

(58) Field of Classification Search .................... 205/517
See application file for complete search history.

(56) References Cited

U.S. PATENT DOCUMENTS 4,313,805 A * 2/1982 Burney et al. ................. 205/345
(Continued)

FOREIGN PATENT DOCUMENTS

JP  62-133095  6/1987
JP  63-33589  2/1988
(Continued)

OTHER PUBLICATIONS

International Search Report issued Jun. 8, 2010 in PCT/JP10/052649 filed Feb. 22, 2010.

*Primary Examiner* — Harry D Wilkins, III
(74) *Attorney, Agent, or Firm* — Oblon, Spivak, McClelland, Maier & Neustadt, L.L.P.

(57) ABSTRACT

A cation exchange membrane which shows suppressed deterioration of the strength of the membrane in the upper portion of an electrolytic cell when the membrane is employed in the electrolytic cell and used for a long term, which can perform electrolysis with good production efficiency, and which can be produced simply with low cost; its production process and; such an electrolytic cell; are provided.

A cation exchange membrane to be used for an electrolytic cell, which has a laminate structure comprising a first layer containing a fluoropolymer having sulfonic groups and a second layer containing a fluoropolymer having carboxylic groups and adjacent to the first layer, and which has a rectangular shape with a constant thickness;

wherein the cation exchange membrane has an attachment region along one (or each) of opposed sides of the cation exchange membrane and a main region other than the attachment region;

the value of the ratio (the thickness of the second layer)/(the total thickness of the first and second layers) in the attachment region is larger than the value of the ratio in the main region. Further, its production process and an electrolytic cell to which the cation exchange membrane is attached.

13 Claims, 3 Drawing Sheets

U.S. PATENT DOCUMENTS

| | | | |
|---|---|---|---|
| 4,426,271 A * | 1/1984 | Yoshida et al. | 204/296 |
| 2006/0016685 A1 * | 1/2006 | Hawkins et al. | 204/296 |
| 2007/0161718 A1 | 7/2007 | Umemura et al. | |
| 2009/0306233 A1 | 12/2009 | Umemura et al. | |

FOREIGN PATENT DOCUMENTS

| | | |
|---|---|---|
| JP | 6-330369 | 11/1994 |
| JP | 10-330510 | 12/1998 |

* cited by examiner

CATION EXCHANGE MEMBRANE, PRODUCTION PROCESS THEREOF AND ELECTROLYTIC CELL USING THE SAME

TECHNICAL FIELD

The present invention mainly relates to a fluorine-containing cation exchange membrane to be used for electrolysis of an alkali chloride, its production process and an electrolytic cell employing such a cation exchange membrane.

BACKGROUND ART

Heretofore, an alkali chloride electrolysis method using an ion exchange membrane method has been known, which electrolyzes an alkali chloride aqueous solution using a fluorine-containing cation exchange membrane as a separation membrane, to produce an alkali hydroxide and chlorine. Further, as such a fluorine-containing cation exchange membrane to be used for electrolysis of an alkali chloride, heretofore, a cation exchange membrane comprising at least two layers that are a layer made of a fluoropolymer having sulfonic groups disposed on an anode side and a layer made of a fluoropolymer having carboxylic groups disposed on a cathode side, has been suitably employed.

In an ion exchange membrane to be used in such an electrolytic cell for electrolysis of alkali chloride, there has been a problem that deterioration of strength of the peripheral portion of the membrane in the vicinity of a clamped portion, particularly in the upper portion of the electrolytic cell, occurs during long term use. The deterioration of strength in the vicinity of the clamping portion is due to a mechanical cause. However, the deterioration of the strength of the membrane in the upper portion of the electrolytic cell is considered to be caused because alkali hydroxide is diffused from the cathode side into the ion exchange membrane in the upper portion of the electric cell where a chlorine gas tends to be accumulated, and the alkali hydroxide reacts with the chlorine gas diffused from the anode side, to deposit alkali chloride, which causes deterioration of the strength of the membrane.

For the purpose of preventing the deterioration of the strength of an ion exchange membrane, there has been proposed a method of covering an upper portion of the ion exchange membrane by an non-permeable film having low ion exchange capacity (refer to Patent Document 1), a method of carrying out a hydrophobizing treatment such as application of a grease to the peripheral portion of the ion exchange membrane (refer to Patent Document 2), and a method of increasing the total thickness of only the peripheral portion of the ion exchange membrane (refer to Patent Document 3).

However, in these methods, there has been such problems that it is necessary to carry out a troublesome shaping process or a treatment operation to an ion exchange membrane, and when the film thickness over the entire membrane is uneven, wrinkles or breakage occurs at a time of rolling in the production.

Here, as a method of adjusting the components of the cation exchange membrane itself to prevent the deterioration of the strength, a method of increasing the thickness of the layer made of a fluoropolymer having carboxylic groups among two layers of the cation exchange membrane, can prevent the deterioration of the strength of the peripheral portion of the cation exchange membrane particularly in the upper portion of the electrolytic cell. However, in this case, the membrane resistance of the entire cation exchange membrane increases, such being not preferred. Further, if the thickness of the layer made of a fluoropolymer having carboxylic groups is reduced for the purpose of reducing the membrane resistance, besides the above deterioration of the strength of the peripheral portion of the membrane particularly in the upper portion, there has been a problem that an alkali chloride diffuses from the periphery of the cation exchange membrane toward the cathode side to deteriorate the quality of product alkali hydroxide.

Under the circumstances, there has been desired a cation exchange membrane for electrolysis of an alkali chloride, which can maintain a good production efficiency when it is employed for the electrolysis, and which can prevent deterioration of the strength of the peripheral portion, particularly along the upper end portion, of the membrane, and which can be produced easily with low cost.

PRIOR ART DOCUMENTS

Patent Documents

Patent Document 1: JP-A-62-133095
Patent Document 2: JP-A-63-33589
Patent Document 3: JP-A-6-330369

DISCLOSURE OF INVENTION

Technical Problem

It is an object of the invention to provide a cation exchange membrane which can suppress deterioration of the strength of the membrane in the upper portion of an electrolytic cell during long term use when the membrane is employed in the electrolytic cell, which realizes electrolysis with good production efficiency, and which can be produced easily with low cost; its production process; and an electrolytic cell which can suppress deterioration of the strength of the cation exchange membrane in the upper portion of the electrolytic cell during long term use, and which realizes electrolysis with good production efficiency.

Solution to Problem

The cation exchange membrane of the present invention is characterized by a cation exchange membrane to be used for an electrolytic cell, which has a laminate structure comprising a first layer containing a fluoropolymer having sulfonic groups and a second layer containing a fluoropolymer having carboxylic groups and adjacent to the first layer, and which has a rectangular shape with a constant thickness;
  wherein the cation exchange membrane has an attachment region along one or each of opposed sides of the cation exchange membrane and a main region other than the attachment region, or the cation exchange membrane further has a boundary region between the attachment region and the main region;
  the value of the ratio (the thickness of the second layer)/(the total thickness of the first and second layers) in the attachment region is larger than the value of the ratio in the main region; and
  when the cation exchange membrane has the boundary region, the boundary region is a region wherein the value of the ratio changes from the attachment region toward the main region.

Further, the present invention provides a process for producing a cation exchange membrane comprising:
  co-extrusion molding a fluoropolymer having precursor groups of sulfonic groups and a fluoropolymer having precursor groups of carboxylic groups, to produce a laminated film constituted by two layers that are respective layers of the fluoropolymers, the laminated film having a constant thickness along the extrusion width direction, the thickness of the layer of the fluoropolymer having precursor groups of carboxylic groups at one or both ends along the extrusion width direction being larger than the thickness in regions other than the ends; and subsequently converting the precursor groups of the respective fluoropolymers of the obtained laminate films into sulfonic groups and carboxylic groups, respectively, to produce a laminated film having a layer containing fluoropolymer having sulfonic groups and a layer containing a fluoropolymer having carboxylic groups.

Further, the present invention provides an electrolytic cell comprising an anode compartment frame having an anode, a cathode compartment frame having a cathode and the cation exchange membrane as defined in any one of Claims 1 to 8, wherein the cation exchange membrane is attached by clamping the peripheral portion of the cation exchange membrane between the anode compartment frame and the cathode compartment frame so that the second layer of the cation exchange membrane faces to the cathode side and the membrane surface is vertically disposed, and so that one side of the cation exchange membrane along which the attachment region is provided is disposed along the upper end of the electrolytic cell.

Advantageous Effects of Invention

With the cation exchange membrane of the present invention, it is possible to suppress deterioration of the strength of the membrane in the upper portion of the electrolytic cell in a long term use when the membrane is employed the electrolytic cell, and to carry out an electrolysis with good production efficiency. Further, with the process for producing cation exchange membrane of the present invention, it is possible to produce the cation exchange membrane simply with low cost. The electrolytic cell of the present invention is an electrolytic cell which can suppress deterioration of the strength of the cation exchange membrane in the upper portion of the electrolytic cell in a long term use, and to carry out electrolysis with good production efficiency.

DESCRIPTION OF EMBODIMENTS

Now, embodiments of the present invention will be described with reference to drawings, but the present invention is not limited to these embodiments.

<Cation Exchange Membrane of the Present Invention>

The cation exchange membrane for electrolytic cell of the present invention is a cation exchange membrane which has a laminate structure comprising a first layer containing a fluoropolymer having sulfonic groups and a second layer containing a fluoropolymer having carboxylic groups and adjacent to the first layer, and which has a rectangular shape with a constant thickness. Further, the cation exchange membrane has an attachment region along one side of the rectangular shape and having a constant width along the entire length of the side (hereinafter it may be referred to as first embodiment), or as an alternative, the cation exchange membrane has an attachment region along each of opposed sides of the rectangular shape and having a certain width over the entire length of each side (hereinafter it may be referred to as second embodiment). The region of the cation exchange membrane other than the attachment region is referred to as main region. As the case requires, the cation exchange membrane has a boundary region having a certain width along the boundary between the attachment region and the main region. When the cation exchange membrane has the boundary region, the region other than the attachment region and the boundary region is referred to as main region. Further, the attachment region and a portion of the membrane to be applied with a clamping pressure (clamping portion) are referred to as regions present inside the rectangular shape. In an actual electrolytic cell, the membrane may extrude outwardly from the clamping portion, but in the following explanations, the periphery of the clamping portion and the side of the rectangular shape are assumed to agree with each other. Here, the width of the attachment region or the boundary region is defined as the width in a direction perpendicular to a side along which the attachment region or the boundary region is provided.

Further, in the cation exchange membrane for electrolytic cell of the present invention, the ratio (thickness of second layer)/(total thickness of first and second layers) in the attachment region is larger than the ratio in the main region. Namely, the thickness of the second layer in the attachment region is relatively larger than the thickness of the second layer in the main region. The cation exchange membrane for electrolytic cell of the present invention has a constant thickness, the thickness of the second layer in the main region is constant, and the thickness of the second layer is constant also in the attachment region.

In this specification, "constant" in the thickness of the cation exchange membrane, the thickness of the first layer containing a fluoropolymer having sulfonic groups, the thickness of the second layer containing a fluoropolymer having carboxylic groups or the total thickness of two layers that are the laminated first and second layers, etc. in a predetermined region, means specifically that the thickness of the membrane or the layer in the region is within a range of ±10% from its average. Further, in this specification, the "constant" thickness of the membrane, film or the layer, etc. in a predetermined region expressed by a numerical value means the average of the thickness of the membrane, film or the layer, etc. of the region.

Further, when the cation exchange membrane has the boundary region, the boundary region is a region wherein the value changes from the attachment region toward the main region. Namely, the boundary region is a region wherein the thickness changes along the width direction from the thickness in the attachment region to the thickness in the main region. The change of the thickness in the boundary region may be continuous or it may be stepwise. Here, when the attachment region is present along two opposed sides, the boundary region may be present each of the two sides or it may be present only along one side. Further, when the boundary region is present each of the two sides, the two boundary regions may be different in e.g. the width, but they usually have substantially the same shape.

The boundary region is a region usually formed at a time of forming a cation exchange membrane by using the co-extrusion molding to be described later, and it is rather difficult to produce a cation exchange membrane having no boundary region. In the present invention, presence of the boundary region does not produce advantageous effects for the main functions of the cation exchange membrane of the present invention, and the width of the boundary region is preferably narrow for the reason that the area of the main region thereby relatively increases. However, a membrane having the boundary region has such merits as easiness of production of the membrane or improvement of uniformity of properties such as the strength of membrane, as compared with a cation exchange membrane having no boundary region.

Figure 1:
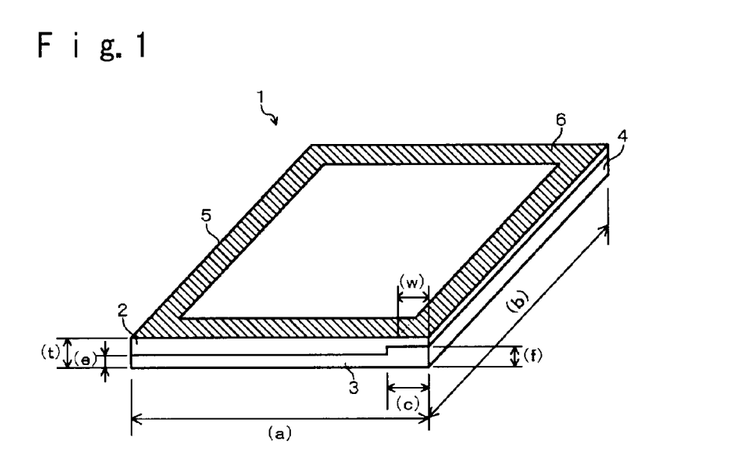
FIG. 1 is a view showing a two layer structure of an example of a first embodiment of the cation exchange membrane of the present invention to be described later.

First, an example of the cation exchange membrane for electrolytic cell of a first embodiment of the present invention will be described with reference to FIG. 1. FIG. 1 is a perspective view schematically showing a cation exchange membrane 1 for electrolytic cell, having a laminate structure comprising a first layer 2 containing a fluoropolymer having sulfonic groups and a second layer 3 containing a fluoropolymer having carboxylic groups and adjacent to the first layer, and having a rectangular shape with a constant thickness.

In the cation exchange membrane of the first embodiment of the present invention, as shown in FIG. 1, the total thickness (t) of two layers that are the first layer and the second layer is constant over the entire cation exchange membrane 1.

Further, the cation exchange membrane of the first embodiment of the present invention has an attachment region along one side (right side 4 in FIG. 1) of the rectangular shape, and the thickness (f) of the second layer in the attachment region is larger than the thickness (e) of the second layer in the region (main region) other than the attachment region. Namely, the ratio f/t is larger than the ratio e/t. Here, the cation exchange membrane of the first embodiment shown in FIG. 1 is a cation exchange membrane having substantially no boundary region.

The cation exchange membrane of the first embodiment of the present invention is a cation exchange membrane to be used for an electrolytic cell, mainly an electrolytic cell for electrolyzing sodium chloride or potassium chloride, and its shape and size, etc. depend on the electrolytic cell for which the membrane is employed. In a typical electrolytic cell, the cation exchange membrane shown in FIG. 1 has a peripheral portion 6 (hatched surface portion), and by clamping the peripheral portion 6, the cation exchange membrane 1 is attached to the electrolytic cell (hereinafter the portion applied with a clamping pressure is referred to as clamping portion). As described later, the clamping portion is a portion of the cation exchange membrane to be in contact with a compartment frame of the electrolytic cell directly or via e.g. a gasket. As the cation exchange membrane, a rectangular cation exchange membrane having a length of from 1,000 to 1,700 mm in the direction corresponding to the vertical direction of the electrolytic cell and a length of from 250 to 3,700 mm in a direction corresponding to the width direction of the electrolytic cell, in terms of the size including the clamping portion 6, is usually employed. When the cation exchange membrane 1 shown in FIG. 1 is installed in the electrolytic cell, the cation exchange membrane is installed vertically so that the side 4 having an attachment region becomes an upper side. Accordingly, the length (b) of the side 4 of the cation exchange membrane 1 having the attachment region is preferably from 250 to 3,700 mm, the length (a) of a side in contact with the side 4 having the attachment region is preferably from 1,000 to 1,700 mm.

In the cation exchange membrane of the first embodiment of the present invention, it is possible to provide a boundary region on the main region side along the attachment region. The ratio of the width of the attachment region to the total width of the attachment region and the boundary region is not particularly limited. Since the cation exchange membrane 1 shown in FIG. 1 has substantially no boundary region, the ratio is substantially 1. The ratio may be small (for example, 0.1) but the width of the attachment region is preferably at least a certain width. Further, if the total width of the attachment region and the boundary region is too large, the area of the main region becomes small and the effective area may become narrow. Accordingly, the ratio of the width of the attachment region to the total width of the attachment region and the boundary region is preferably at least 0.4, more preferably at least 0.6. It is still more preferably from 0.9 to 1.

In the cation exchange membrane of the first embodiment of the present invention, the thickness (f) of the second layer in the attachment region depends on the design of an electrolytic cell to which the membrane is employed, and the thickness (f) is specifically at least 120%, more preferably at least 130% of the thickness (e) of the second layer in the main region. Further the ratio of (f) to (e) ((f/e)×100) is preferably at most 400%, more preferably at most 300%. Further, the specific thicknesses of the second layer is preferably such that under the condition that (f) and (e) satisfy the above relation, (e) is from 5 to 18 µm and (f) is from 18 to 30 µm. Further, the thicknesses are more preferably such that (e) is from 7 to 15 µm and (f) is from 18 to 25 µm.

When the cation exchange membrane is installed in the electrolytic cell, a portion functioning as an effective area is a portion other than the clamping portion 6 in FIG. 1, and most of such a portion is the main region, and the main region functions as an effective area. If the thickness (e) of the second layer in the main region is smaller than 5 µm, reduction of electrolytic voltage at a time of electrolysis is large, but high current efficiency does not develop and at a time of electrolysis of sodium chloride, the amount of sodium chloride in a product sodium hydroxide may become large. Further, if the thickness (e) of the main region is larger than 18 µm, cell voltage at a time of electrolysis may become high.

In the cation exchange membrane of the first embodiment of the present invention, if the thickness (f) of the second layer in the attachment region is smaller than 18 µm, reduction of strength in long term use cannot be suppressed in some cases. Further, if the thickness (f) of the second layer in the attachment region is larger than 30 µm, cell voltage may become high in some cases.

Here, characteristics of the thickness of the second layer in the cation exchange membrane of the first embodiment of the present invention has been described above by using the embodiment shown in FIG. 1 as an example. However, in cation exchange membranes of the first embodiment of the present invention other than the embodiment shown in FIG. 1, the characteristics of the thickness of the second layer, that are, the thickness in the attachment region, the thickness in the main region and figures showing these relations, are the same as those described above.

In the cation exchange membrane of the first embodiment of the present invention, the total thickness of the two layers that are the first layer and the second layer (thickness (t) in FIG. 1) is constant over the entire cation exchange membrane, and the thickness (t) is specifically preferably from 50 to 300 µm. If the total thickness (t) of the two layers that are the first layer and the second layer is smaller than 50 µm, the membrane strength may become low, and if the total thickness (t) of the two layers is larger than 300 µm, cell voltage at a time of electrolysis may become high.

Here, from the thickness of the second layer described above (thickness (f) of attachment region and thickness (e) of main region) and the total thickness (t) of two laminated layers that are the first layer and the second layer, it is possible to calculate the thickness of the attachment region and the thickness of the main region of the first layer. Further, the first layer itself of the cation exchange membrane of the first embodiment of the present invention may have a laminated structure of at least two fluoropolymer layers having sulfonic groups.

Here, the cation exchange membrane of the present invention is attached to an electrolytic cell by a normal method, specifically, by disposing the cation exchange membrane vertically between an anode compartment frame having an anode and a cathode compartment frame having a cathode so that a surface of the second layer face to the cathode side, and clamping the clamping portion of the cation exchange membrane. The cation exchange membrane of the first embodiment of the present invention is preferably attached so that the main region of the cation exchange membrane, that is a region wherein the thickness of the second layer is relatively small, is disposed more inside than the clamping portion in the upper portion of the membrane, in order to make it possible to suppress deterioration of the strength in the upper portion of the electrolytic cell in long term use. In other words, the position of the main region side end of the attachment region (hereinafter referred to as inner edge; this term is also applied to the clamping portion and the boundary region) is preferably present outside the inner edge of the clamping portion. For this purpose, in the cation exchange membrane of the first embodiment of the present invention shown in FIG. 1 (a membrane wherein the outer periphery of the clamping portion agrees with the outer edge of the attachment portion as shown in FIG. 1), the width of the attachment region is preferably wider than the width of the clamping portion.

Further, in a cation exchange membrane of the first embodiment of the present invention having a boundary region, the inner edge of the boundary region is preferably present outside the inner edge of the clamping portion. Further, the position of the inner edge of the clamping portion is preferably present the same position or outside the inner edge of the clamping portion (that is, the entire boundary region is present outside the clamping portion). In a membrane like the membrane shown in FIG. 1 wherein the outer periphery of the clamping portion agrees with the outer edge of the attachment region, the total width of the attachment region and the boundary region is preferably wider than the width of the clamping portion to the electrolytic cell, and the width of the attachment region is preferably equal or larger than the width of the clamping portion.

Specifically, in the case of the cation exchange membrane shown in FIG. 1 that is a preferred embodiment of the cation exchange membrane of the first embodiment of the present invention, when the cation exchange membrane is installed in an electrolytic cell, the inner edge of the attachment region is preferably present at a position at least 15 mm and at most 150 mm inside, that is toward the main region side, from the inner edge of the clamping portion. In the case of the membrane shown in FIG. 1, the width (c) of the clamping portion in the figure is preferably set to be a value obtained by adding 15 to 150 mm to the width (w) of the clamping portion 6. Further, a preferred range of the width (c) of the attachment portion of the cation exchange membrane of the first embodiment of the present invention may be a range obtained by adding 20 to 100 mm to the width (w) of the clamping portion 6. If the range is less than 15 mm, deterioration of the strength in a long term use may not be suppressed, and if the range exceeds 150 mm, cell voltage may become high.

The widths of the clamping portions along four respective sides may be different. Usually, the widths of the clamping portions of four respective sides are substantially equal. The width of the clamping portion changes depending on electrolytic cell, but it is usually from 60 to 200 mm.

Here, when the cation exchange membrane of the first embodiment of the present invention has the boundary region as described above, the cation exchange membrane is preferably disposed in the electrolytic cell so that the boundary region is outside the clamping portion. Namely, it is preferred to employ a cation exchange membrane having an attachment region wherein the width (c) of the attachment region is equal or larger than the width (w) of the clamping portion and having a boundary region on the main region side of the attachment region, and to dispose the cation exchange membrane in an electrolytic cell so that a portion of the membrane in contact with a compartment frame of the electrolysis cell (clamping portion) is inside the attachment portion. In this case, since the boundary region becomes an electrolysis surface, the width of the boundary region is preferably as small as possible. Specifically, it is preferred that the inner edge of the attachment region is present at the same position or toward the main region from the inner edge of the clamping portion (here, the exceeding amount from the inner edge of the clamping portion is at most 150 mm), and that the exceeding amount of the inner edge of the boundary region from the inner edge of the clamping portion is at most 250 mm. Accordingly, in a case of installing the cation exchange membrane having a boundary region in an electrolytic cell, the membrane is preferably installed so that the inner edge of the boundary region is present at a position within 400 mm toward the main region from the inner edge of the clamping portion.

The present invention provides, besides the cation exchange membrane of the first embodiment of the present invention, a cation exchange membrane of a second embodiment of the present invention which has along each of two opposed sides the structure of the attachment region provided along one side of the above-described cation exchange membrane, mainly from the viewpoint of handling at a time of installing the cation exchange membrane in an electrolytic cell and from the viewpoint of suppressing a problem of deterioration of the strength of the membrane due to precipitation of a salt in a lower side portion although this problem is not serious as compared with the upper side portion of the cation exchange membrane disposed in the electrolytic cell.

Figure 2:
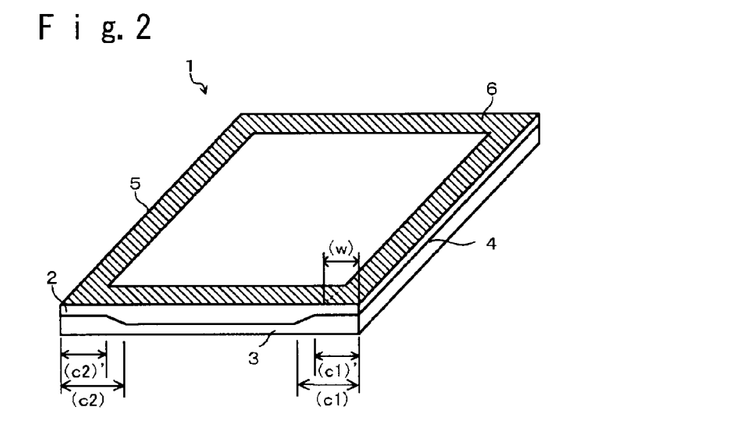
FIG. 2 is a view showing a two layer structure of an example of a second embodiment of the cation exchange membrane of the present invention to be described later.

An example of the cation exchange membrane for electrolytic cell of the second embodiment of the present invention will be described with reference to FIG. 2. FIG. 2 is a perspective view schematically showing a cation exchange membrane 1 for electrolytic cell, which has a laminated structure comprising a first layer 2 containing a fluoropolymer having sulfonic groups and a second layer 3 containing a fluoropolymer having carboxylic groups and adjacent to the first layer, and which has a rectangular shape with a constant thickness.

In the cation exchange membrane of the second embodiment of the present invention, the total thickness of two layers that are the first layer and the second layer is constant over the entire cation exchange membrane 1.

Further, the cation exchange membrane of the second embodiment of the present invention has an attachment region along one side (side 4 on right side in FIG. 1) of the square shape, and another attachment region along a side 5 opposed to the side 4. Further, along each attachment region, a boundary region is present. The region other than the attachment regions and the boundary regions is a main region. The thickness of the second layer in two attachment regions is larger than the thickness of the second layer in the main region. Each boundary region is a region wherein the thickness of the second layer changes from the attachment region toward the main region, and in the cation exchange membrane shown in FIG. 2, the thickness of the second layer gradually decreases from the attachment region toward the main region as shown in the Figure.

Along the side 4 having a right side attachment region in FIG. 2, provided that the width of the attachment region is (c1)' and the total width of the attachment region and adjacent boundary region is (c1), the width of the boundary region becomes (c1)-(c1)'. Along a side 5 having a left side attachment region in FIG. 2, provided that the width of the attachment region is (c2)' and the total width of the attachment region and adjacent boundary region is (c2), the width of the boundary region becomes (c2)-(c2)'. In a case of attaching the cation exchange membrane shown in FIG. 2 in an electrolytic cell, any of the side 4 having a right side attachment region in FIG. 2 and the side 5 having the left side attachment region in FIG. 2 may become upper side, but in the following description, the membrane is assumed to be attached so that the side 4 having the right side attachment region in FIG. 2 becomes upper side.

In the cation exchange membrane of the second embodiment of the present invention, the widths (c1) and (c2) or the widths (c1)' and (c2)' are not necessarily the same, but from the viewpoint of workability of attaching the cation exchange membrane to the electrolytic cell, they are preferably the same. Further, the thicknesses of the second layer in the attachment regions are not necessarily the same so long as they are larger than the thickness in the main region, but they are preferably the same for the same reason as described above.

Here, at a time of attaching the cation exchange membrane of the second embodiment of the present invention to the electrolytic cell, in the same manner as the case of attaching the cation exchange membrane of the first embodiment of the present invention to the electrolytic cell, in order to make it possible to suppress deterioration of the strength in a long term use, the cation exchange membrane is preferably attached so that the main region becomes more inside than clamping portion in the upper portion of the membrane and the lower portion of the membrane, and for this purpose, the cation exchange membrane is preferably designed so that the inner edge of the attachment region (inner edge of a border region when the membrane has the border region) is present toward the main region from the inner edge of the clamping portion. The cation exchange membrane is more preferably designed so that the inner edge of the attachment region is present toward the main region from the inner edge of the clamping portion regardless of presence or absence of the border region.

Specifically, in the case of the cation exchange membrane of the second embodiment shown in FIG. 2, the total width of the attachment region (the region indicated by the width (c1)' and the region indicated by the width (c2)' in FIG. 2) and the boundary region ((c1) on the side along side 4, (c2) on the side along side 5) is preferably larger than the width of the clamping portion 6 along each side ((w) in the case of the width along side 4).

In the cation exchange membrane of the second embodiment of the present invention, the distance from the inner edge of the boundary region to the inner edge of the clamping portion is preferably at most 250 mm. If the distance exceeds 250 mm, an effect of reducing the cell voltage at a time of electrolysis may not be significantly developed. In the cation exchange membrane shown in FIG. 2, (c1)-(w) is preferably at most 250 mm. Also in the boundary region along the side 5, the inner edge of the boundary region is preferably present within 250 mm from the inner edge of the clamping portion.

Further, regardless of presence or absence of the boundary region, the distance from the inner edge of the attachment region to the inner edge of the clamping portion is preferably at least 0, more preferably at least 15 mm, still more preferably at least 20 mm. Further, this distance is preferably at most 150 mm, more preferably at most 100 mm. In the cation exchange membrane shown in FIG. 2, the distance along the side 4 corresponds to (c1)'-(w).

With respect to preferred ranges of the thickness and width of each attachment region, the thickness of the main region, the ratio of the thickness of each attachment region to the thickness of the main region, the ratio of the width of the attachment region to the width of the boundary region, the width of the clamping portion, the ratio of the width of the attachment region or the boundary region to the width of the clamping portion, etc., of the cation exchange membrane of the second embodiment of the present invention are similar to those of the cation exchange membrane of the first embodiment of the present invention.

In the cation exchange membrane of the present invention, as the fluoropolymer having sulfonic groups employed in the first layer, one produced by copolymerizing at least one type of monomer represented by the following formula (1) and at least one type of monomer represented by the following formula (2) to obtain a copolymer and converting a precursor group of sulfonic group included in the copolymer, that is the group represented by "-A" in the following formula (2), into a sulfonic group, may be mentioned.

$$CF_2 = CX^{11}X^{12} \qquad (1)$$

(Here, in formula (1), $X^{11}$ and $X^{12}$ each independently represents a fluorine atom, a chlorine atom, a hydrogen atom or a trifluoromethyl group.)

$$CF_2 = CF(OCF_2CFX^{13})_sO(CF_2)_t\text{-}A \qquad (2)$$

(Here, in formula (2), $X^{13}$ represents a fluorine atom or a trifluoromethyl group, s is 0, 1 or 2, t is an integer of from 1 to 3, and A represents a precursor group convertible to a sulfonic group that is hydrolyzed in an alkaline solvent.)

Here, in this specification, a sulfonic group means a group represented by $-SO_3M'$ (wherein M' represents hydrogen or an alkaline metal).

As a monomer represented by the above formula (1), specifically, $CF_2=CF_2$, $CF_2=CF(CF_3)$, $CF_2=CH_2$, $CF_2=CFH$ or $CF_2=CFCl$ is preferred.

Further, as the precursor group convertible to a sulfonic group, $-SO_2F$ is preferred, and as the monomer represented by the above formula (2), specifically, the following monomers are preferred.

In terms of the ratio between at least one type of the monomer represented by the above formula (1) and at least one type of the monomer represented by the above formula (2) in the copolymerization, in the fluoropolymer having precursor groups of sulfonic groups to be obtained, based on all polymerized units constituting the polymer, the polymerizable unit formed by copolymerization of the monomer represented by formula (1) is from 70 to 95 mol %, preferably from 80 to 90 mol %, and polymerizable unit formed by copolymerization of the monomer represented by formula (2) is from 5 to 30 mol % preferably from 10 to 20 mol %. A preferred molecular weight of the fluoropolymer having the precursor groups of sulfonic groups may be from $10^4$ to $10^6$ in terms of number-average molecular weight.

A fluoropolymer having precursor groups of sulfonic groups obtained by the above step has a thermal fusion property, and is formable by e.g. extrusion molding with heating. In the present invention, by applying a production process of the present invention to be described later to the fluoropolymer, a fluoropolymer having sulfonic groups constituting the first layer of the cation exchange membrane of the present invention is obtained.

In the cation exchange membrane of the present invention, the ion exchange capacity of the fluoropolymer having sulfonic groups to be employed in the first layer, is preferably from 0.8 to 1.3 meq/g dry resin. If the ion exchange capacity exceeds the above range, membrane strength tends to decrease, and if the ion exchange capacity is less than the above range, membrane resistance may become high. The ion exchange capacity is particularly preferably from 0.9 to 1.2 meq/g. Here, this ion exchange capacity can be achieved by making the ratio between the polymerized unit from the monomer represented by the above formula (1) and the polymerizable unit from the monomer represented by formula (2) in the fluoropolymer having precursor groups of sulfonic groups, to be within the above range.

In the cation exchange membrane of the present invention, the fluoropolymer having carboxylic groups employed in the second layer, may be one obtained by copolymerizing at least one type of monomer represented by the following formula (3) and at least one type of monomer represented by the following formula (4) or (5) to obtain a copolymer, and converting a precursor group of carboxylic group of the copolymer, that is the group represented by —B in the following formula (4) or (5), into a carboxylic group.

(Here, in formulae (3), (4) and (5), $X^{21}$ and $X^{22}$ each represents a fluorine atom, a chlorine atom, a hydrogen atom or a trifluoromethyl group, $X^{23}$ is a fluorine atom or a trifluoromethyl group, v is an integer of from 0 to 3, w is an integer of from 1 to 5, B is a precursor group that is convertible to a carboxylic group by being hydrolyzed in an alkaline solution, x is an integer of from 1 to 5, and x+y is an integer of from 2 to 6.)

Here, in this specification, a carboxylic group is a group represented by —COOM (here, M represents a hydrogen atom or an alkaline metal).

The monomer represented by the above formula (3) is preferably $CF_2=CF_2$, $CF_2=CF(CF_3)$, $CF_2=CH_2$, $CF_2=CFH$ or $CF_2=CFCl$.

Further, the precursor group convertible to a carboxylic group is preferably the following —COOR, and the monomer represented by the above formula (4) is preferably any one of the monomers (4-1) to (4-5) shown below.

(Here, in formulae (4-1) to (4-5), R is a $C_{1-10}$ alkyl group that may be branched.)

Further, the monomer represented by the above formula (5) is preferably the monomer (5-1) or the monomer (5-2) shown below.

(Here, in formulae (5-1) and (5-2), R is a $C_{1-10}$ alkyl group that may be branched.)

In terms of the ratio between at least one type of monomer represented by the above formula (3) and at least one type selected from monomers represented by formula (4) and formula (5) in the copolymerization, based on all polymerizable units constituting the fluoropolymer having precursor groups of carboxylic groups to be obtained, the ratio of polymerizable units produced by copolymerizing the monomer represented by formula (3) is from 70 to 90 mol %, preferably from 80 to 90 mol %, and the ratio of the polymerizable units produced by copolymerizing the monomer represented by formula (4) and the monomer represented by formula (5) is from 5 to 30 mol %, preferably from 10 to 20 mol %. Further, the molecular weight of the fluoropolymer having precursor groups of carboxylic groups is preferably from $10^4$ to $10^6$ in terms of number-average molecular weight.

The fluoropolymer having precursor groups of carboxylic groups obtained by the above process has a thermal fusion property and is formable by e.g. extrusion molding with heating. In the present invention, the production process of the present invention to be described later is applied to the fluoropolymer to produce a fluoropolymer having carboxylic groups constituting the second layer of the cation exchange membrane of the present invention.

In the cation exchange membrane of the present invention, the ion exchange capacity of the fluoropolymer having carboxylic groups to be employed for the second layer depends on the structure of side chains, and is preferably from 0.7 to 1.3 meq/g dry resin. If the ion exchange capacity exceeds the above range, current efficiency tends to be low, and if the ion exchange capacity is less than the above range, membrane resistance becomes high and the current efficiency may become low. The ion exchange capacity is particularly preferably from 0.8 to 1.2 meq/g.

Here, this ion exchange capacity can be achieved by making the ratio between polymerized units from the monomer represented by the above formula (3) and polymerizable units from the monomers represented by formula (4) and formula (5) in the fluoropolymer having precursor groups of carboxylic groups, to be within the above range.

As described above, the cation exchange membrane of the present invention comprises two laminated layers that are a first layer containing a fluoropolymer having sulfonic groups and a second layer containing a fluoropolymer having carboxylic groups. However, as the case requires, in the cation exchange membrane, besides these two layers, a known reinforcement member may be laminated by a known method. As such a reinforcement member, a woven cloth, a nonwoven cloth, a fibril, a porous body, etc. may be mentioned. As the material of the reinforcement member, a fluoropolymer such as polytetrafluoroethylene (hereinafter referred to as PTFE) may be mentioned. In particular, by embedding the reinforcement member in the first layer, a reinforced cation exchange membrane is obtained, such being preferred.

Further, in the cation exchange membrane of the present invention, it is possible and preferred to apply a treatment for releasing a gas such as chlorine gas or hydrogen gas to at least one surface of the cation exchange membrane in order to further improve long-term stability of current efficiency and cell voltage of the ion exchange membrane so long as the treatment does not deteriorate the effect of the present invention. As the treatment method, a known method such as a method of forming fine irregularities on a surface of an ion exchange membrane (JP-B-60-26495), a method of providing a gas and liquid-permeable porous layer containing particles having no electrode activity (JP-A-56-75583, JP-A-57-39185) may, for example, be mentioned.

As the method of providing a porous layer, a method of providing a porous layer containing fine particles of e.g. zirconium oxide and a binder on both surfaces of a cation exchange membrane, may, for example, be mentioned. Specifically, for example, an ethanol solution containing fine particles of zirconium oxide and a fluoropolymer having sulfonic groups is sprayed to be applied on both surfaces of a cation exchange membrane, and dried to form porous layers. At this time, the fluoropolymer having sulfonic groups used as a binder does not contribute to cation exchange of the cation exchange membrane. Accordingly, even if the porous layer is formed on a surface of the second layer, the surface is regarded as the second layer in the present invention.

By employing such a cation exchange membrane of the present invention as a separation membrane between an anode compartment and a cathode compartment in an electrolytic cell, it is possible to suppress deterioration of the strength of membrane in the upper portion of the electrolytic cell in a long-term use, and to carry out electrolysis, particularly alkaline chloride electrolysis, with good production efficiency.

<Process for Producing Cation Exchange Membrane of the Present Invention>

Next, embodiments of the process for producing a cation exchange membrane of the present invention will be described below.

The process for producing a cation exchange membrane of the present invention is a process for producing a cation exchange membrane comprising: co-extrusion molding a fluoropolymer having precursor groups of sulfonic groups and a fluoropolymer having precursor groups of carboxylic groups, to produce a laminated film constituted by two layers that are respective layers of the fluoropolymers, the laminated film having a constant thickness along the extrusion width direction, the thickness of the layer of the fluoropolymer having precursor groups of carboxylic groups at one or both ends along the extrusion width direction being larger than the thickness in regions other than the ends; and subsequently converting the precursor groups of the respective fluoropolymers of the obtained laminated films into sulfonic groups and carboxylic groups, respectively, to produce a laminated film having a layer containing fluoropolymer having sulfonic groups and a layer containing a fluoropolymer having carboxylic groups.

The fluoropolymer having precursor groups of sulfonic groups and the fluoropolymer having precursor groups of carboxylic groups to be employed in the process of the present invention, are as described above. These fluoropolymers are each a polymer having a thermal fusion property and a thermal moldability.

Figure 3:
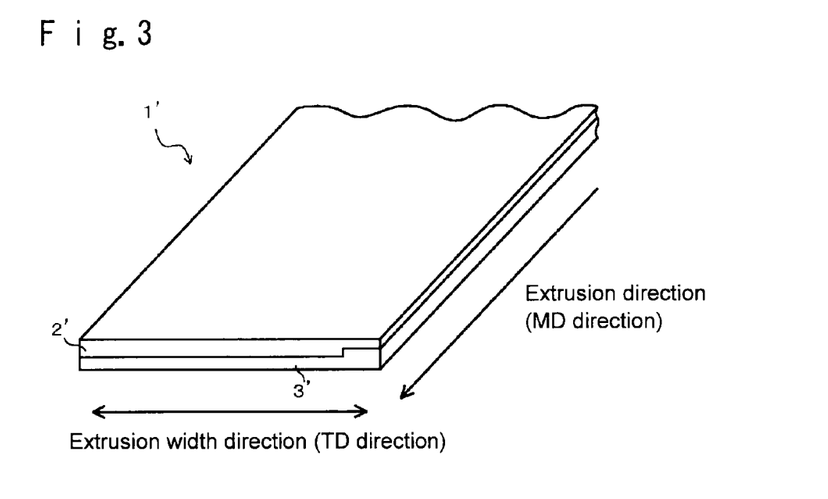
FIG. 3 is a view showing an example of a laminated film obtained by a step of the process for producing the cation exchange membrane of the present invention.
Figure 4:
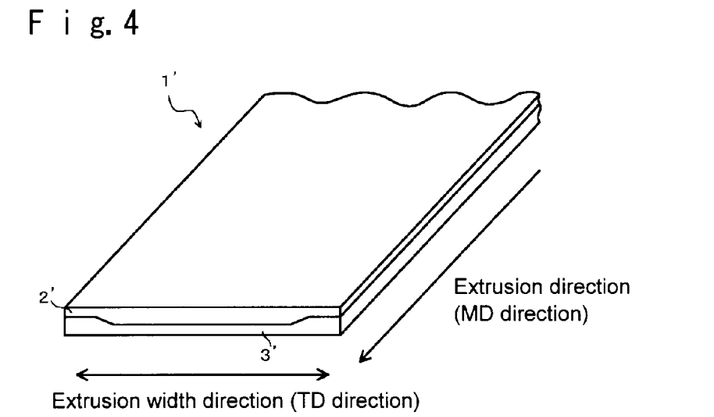
FIG. 4 is a view showing another example of a laminated film obtained by a step of the process for producing cation exchange membrane of the present invention.

In the process of the present invention, first, by using thermal fusion property of the fluoropolymer being the above material, coextrusion molding is carried out to produce a laminated film which has a thickness distribution in the extrusion width direction (TD direction) shown in FIGS. 3 and 4, which is constituted by two layers that are a layer made of a fluoropolymer having precursor groups of sulfonic groups and a layer of fluoropolymer having precursor groups of carboxylic groups, and which has a constant thickness in the extrusion width direction.

The layer of fluoropolymer having precursor groups of sulfonic groups is a layer finally forming the first layer of the cation exchange membrane of the present invention or a layer constituting a part of the first layer. Hereinafter, the layer is referred to as a sulfonic precursor layer as the case requires. Further, the layer of fluoropolymer having precursor groups of carboxylic groups is a layer finally forming the second layer of the cation exchange membrane of the present invention or layer constituting a part of the second layer. Hereinafter, in this specification, the layer is referred to as a carboxylic precursor layer as the case requires.

Embodiments of the coextrusion molding in the process of the present invention to obtain the laminated films shown in FIGS. 3 and 4, respectively, will be described below.

The laminated film 1' shown in FIG. 3 is constituted by a sulfonic precursor layer 2' and a carboxylic precursor layer 3'. The thickness of the laminated film is constant in the width direction, while the thickness of the carboxylic precursor layer 3' is so distributed that the thickness in a region within a predetermined width from one side (region to be attachment region in the cation exchange membrane in FIG. 1) is larger than the thickness in other regions (region to be main region of the cation exchange membrane in FIG. 1).

This structure is a structure of a laminated film to obtain an embodiment of the cation exchange membrane of the first embodiment of the present invention shown in FIG. 1, and with respect to specific thicknesses of layers, the description regarding the second layer described in FIG. 1 corresponds to the carboxylic precursor layer 3' and the description regarding the first layer corresponds to the sulfonic precursor layer 2'. Further, the width of a region where the thickness of the carboxylic precursor layer 3' is large, is specifically preferably a width covering a region up to 15 to 150 mm more inside from the inner edge of a clamping portion when the cation exchange membrane is completed.

The laminated film 1' shown in FIG. 4 comprises a sulfonic precursor layer 2' and a carboxylic precursor layer 3', and the thickness of the laminated film is constant along the width direction. In terms of the thickness of the carboxylic precursor layer 3', the thickness in regions within a predetermined width from respective sides (regions corresponding to attachment regions of the cation exchange membrane of FIG. 2) is larger than the thickness in the main region other than the above regions (region corresponding to the main region of the cation exchange membrane of FIG. 2). Further, the laminated film 1' has a region wherein the thickness of the carboxylic precursor layer 3' gradually decreases (region to be boundary region of cation exchange membrane of FIG. 2) between each the above regions within a predetermined width from respective sides and the above main region.

This structure is a structure of a laminated film to obtain an embodiment of the cation exchange membrane of the second embodiment of the present invention shown in FIG. 2. In terms of specific thicknesses of layers, the description regarding the second layer explained in FIG. 2 corresponds to the carboxylic precursor layer 3', and the description regarding the first layer corresponds to the sulfonic precursor layer 2'. The width of the region wherein the thickness of the carboxylic precursor layer 3' is large is similar to the width of the above laminated film shown in FIG. 3, but the width of the region wherein the above thickness gradually decreases is preferably within 250 mm.

As a method of obtaining the laminated film 1' having a thickness distribution shown in FIG. 3 or 4, for example, a method of designing the shape of a die of a co-extrusion molding apparatus according to the distribution of layer thickness or a method of adjusting the temperature setting along the width direction of a die of a co-extrusion molding apparatus, is mentioned.

As the method of adjusting the temperature setting of a die in co-extrusion molding, specifically, there is mentioned a method of controlling the molding temperature of at least one of the two types of fluoropolymers having precursor groups so that the molding temperature of a portion wherein the thickness of a layer made of the above at least one of the fluoropolymers becomes large along the extrusion width direction (TD direction), becomes higher than the molding temperature of other portions, and thereby adjusting the thickness of each layer to be obtained. Here, FIGS. 3 and 4 also show the extrusion direction (MD direction).

Each of the two types of fluoropolymers having precursor groups has a thermal fusion property, and its melting viscosity changes depending on the temperature, and as the temperature becomes high, the viscosity becomes low and as the temperature becomes low, the viscosity becomes high. By using such a property, for example, by making the extrusion temperature of a fluoropolymer having precursor groups of sulfonic groups (hereinafter referred to as "sulfonic precursor-containing polymer") constant along the width direction, and setting the extrusion temperature of a fluoropolymer having precursor groups of carboxylic groups (hereinafter referred to as "carboxylic precursor-containing polymer") to be low at the center in the extrusion width direction and high at both end portions, then, while the thickness in the entire laminated film 1' to be obtained becomes constant, the melting viscosity of the central portion of the carboxylic precursor layer 3' rises to decrease the extrusion amount to reduce the thickness of the layer, and the melting viscosity in both side portions of the layer decreases to increase the extrusion amount to increase the layer thickness, whereby the distribution of layer thickness shown in FIG. 4 can be obtained.

In the same manner, by making the extrusion temperature of the carboxylic precursor-containing polymer constant along the width direction and setting the extrusion temperature of the sulfonic precursor group-containing polymer to be high in the central portion in the extrusion width direction and to be low in both end portions, then, while the entire film thickness of the laminated film 1' to be obtained is constant, the melting viscosity in the central portion of the sulfonic precursor layer 2' decreases to increase the extrusion amount to increase the thickness of the layer, and the melting viscosity in both side portions increases to decrease the extrusion amount to reduce the film thickness, whereby the distribution of the layer thickness shown in FIG. 4 can be obtained. Further, it is also possible to adjust the film thickness by controlling the extrusion temperature of the carboxylic precursor group-containing polymer and the extrusion temperature of the sulfonic precursor group-containing polymer in the width direction.

However, at a time of producing the cation exchange membrane of the present invention by co-extruding the above film having the two-layer structure, a method of controlling the extrusion temperature of the carboxylic precursor group-containing polymer having a smaller thickness in the entire film to adjust the thickness of the carboxylic precursor layer 3', is preferred since adjustment of the layer thickness is easy in this method.

Figure 5:
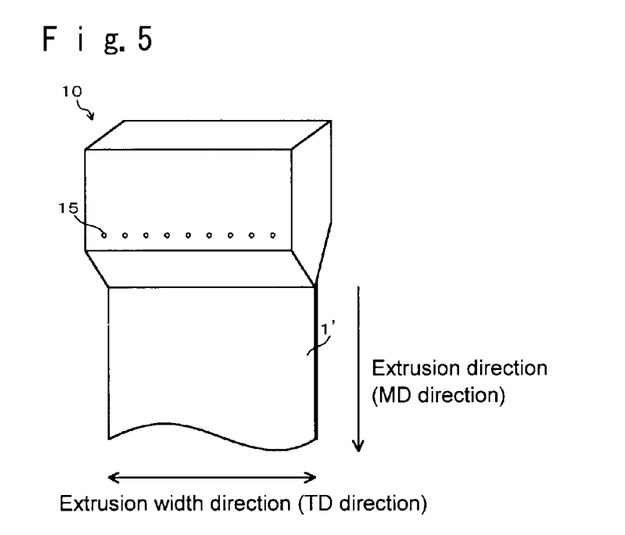
FIG. 5 is a view showing the external appearance of an example of a T-type co-extrusion die usable for the process for producing cation exchange membrane of the present invention.
Figure 6:
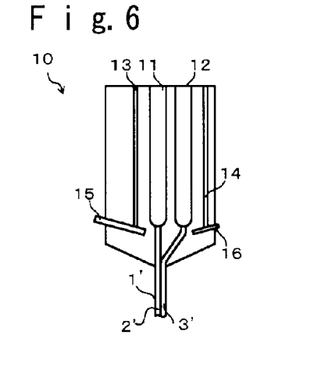
FIG. 6 is a view showing a cross section of an example of a T-type co-extrusion die usable for the process for producing cation exchange membrane of the present invention.

Further, the co-extrusion molding using the temperature distribution will be described with reference to a drawing showing an example of a die of a co-extrusion molding apparatus to be employed. FIGS. 5 and 6 are an external view and a cross sectional view, respectively, each showing an example of a typical T-type co-extrusion die.

As shown in FIG. 6, a T-type co-extrusion die 10 has a sulfonic precursor group-containing polymer-supplying pipe 11, a sulfonic precursor group-containing polymer heater 13 for heating the pipe, a sulfonic precursor group-containing polymer thermocouple 15 for detecting the temperature of the heater 13, a carboxylic precursor group-containing polymer supplying pipe 12, a carboxylic precursor group-containing polymer heater 14 for heating the pipe, and a carboxylic precursor group-containing polymer thermocouple 16 for detecting the temperature of the heater 14.

The T-type co-extrusion die 10 is provided with heaters for sulfonic precursor group-containing polymer and for carboxylic precursor group-containing polymer, respectively, to heat the two types of extrusion material polymers independently. Further, a plurality of these material polymer heating heaters are disposed along the extrusion width direction of respective polymers (9 heaters for each type of polymer material although not shown), a plurality of thermocouples connecting to respective heaters are disposed along the extrusion width direction (9 thermocouples for each type of polymer material) as shown in the external view FIG. 5. In FIG. 5, the number of thermocouples 15 is 9 since only one side of the T-type co-extrusion die 10, that is only the sulfonic precursor group-containing polymer supply side, is shown. However, also on the other side, that is on the sulfonic precursor group-containing polymer supply side, a plurality of thermocouples (9 thermocouples) connecting to respective heaters are provided.

With such a T-type co-extrusion die 10, it is possible to control the temperature of a plurality of regions in the width direction of the T-type die for each of the sulfonic precursor group-containing polymer and the carboxylic precursor group-containing polymer independently at the time of co-extrusion molding. For example, the laminated film 1' comprising the sulfonic precursor layer 2' and the carboxylic precursor layer 3' and having the layer thickness distribution shown in FIG. 4 can be produced by setting the temperatures of 9 heaters along the extrusion width direction on the sulfonic precursor group-containing polymer supply side to be the same temperature (for example, the same temperature within a range of from 200 to 300° C. depending on the polymer employed), setting the temperatures of two heaters on each side among 9 heaters along the extrusion width direction on the carboxylic precursor polymer supply side to be a high temperature (for example the same temperature within a range of from 220 to 280° C. depending on the polymer employed), setting other 5 heaters to be a low temperature (for example, the same temperature within a range of from 200 to 260° C.) in the T-type co-extrusion dies 10, and carrying out co-extrusion molding.

Further, in the production process of the present invention, conditions of co-extrusion molding other than the temperature control, such as the size of material polymer extrusion port, extrusion speed of the material polymer, etc. may be set to be same as those of normal co-extrusion molding.

Here, with the T-type coextrusion die capable of setting temperatures of about 9 sections along the extrusion width direction shown above, a temperature gradient is formed in the carboxylic precursor polymer in the vicinity of a border between heaters having different temperature settings, that is in the vicinity of the border between second and third heaters from the carboxylic precursor polymer supply side edge. Accordingly, the thickness of the carboxylic precursor layer 3' gradually decreases from a position on the film center side of the second heater toward a point on the film edge side of the third heater so as to correspond to the above temperature gradient. In order to reduce the gradual reduction area of the layer thickness thus formed, a method of increasing the number of heaters disposed along the extrusion width direction to carry out more precise temperature control, or a method of changing the shape of the T-type coextrusion die itself, may be mentioned.

In the production process of the present invention, a laminated film, thus obtained, having a layer made of a fluoropolymer having sulfonic precursor groups and a layer made of a fluoropolymer having carboxylic precursor groups, that are laminated, is immersed in an alkaline solution by a common method, to convert the precursor group of the sulfonic group to be a sulfonic group and convert the precursor group of carboxylic group to a carboxylic group, thereby to obtain a two layer structure which is essential to the cation membrane for electrolytic cell of the present invention.

Here, in the production process of the present invention, it is also possible to produce a two layer structure having a desired layer thickness distribution in the same manner as above so long as the two-layer structure is within the category of the cation exchange membrane of the present invention even if the layer thickness distribution of the two-layer structure which is essential to the cation exchange membrane to be obtained, is different from that of the laminated film shown in FIGS. 3 and 4.

Here, before and/or after the conversion treatment of the precursor group of sulfonic group and precursor group of carboxylic group into sulfonic group and carboxylic group, respectively, as the case requires, a step of laminating e.g. the above-described reinforcement member or other various types of surface treatment steps may be applied to the laminated film after the above extrusion molding and before the conversion treatment of precursor groups, to produce a cation exchange membrane wherein the reinforcement member is laminated and/or that is applied with the various types of surface treatments. The step of laminating e.g. a reinforcement member and a step of other various types of surface treatments may be conventionally known methods.

Further, at the time of obtaining a laminated film by extrusion molding, another layer having a precursor group of sulfonic group or a precursor group of carboxylic group may be laminated to form a laminated film having a multilayer structure.

In the case of producing a cation exchange membrane reinforced by a reinforcement member, it is preferred to reinforce the first layer having relatively a large thickness in the main region. In this case, it is preferred to laminate the reinforcement member and a film made only of a precursor of sulfonic group in this order on the sulfonic precursor layer of the laminated film obtained by the above process, and heating and pressurizing is carried out to integrate the sulfonic precursor layer, the film of sulfonic precursor and the reinforcement member embedded between them, and thereafter, convert the precursor groups to produce the cation exchange membrane. It is also possible to convert the precursor group of the laminated film obtained by the above process, followed by employing and laminating the reinforcement member and the film of fluoropolymer having sulfonic groups in the same manner as above to produce a cation exchange membrane reinforced by the reinforcement member.

Next, by cutting the cation exchange membrane thus obtained, into a size suitable to be installed in an electrolytic cell, the cation exchange membrane for electrolytic cell of the present invention is obtained.

<Electrolytic Cell of the Present Invention>

The electrolytic cell of the present invention is an electrolytic cell wherein the cation exchange membrane of the present invention is attached between an anode compartment frame having an anode and a cathode compartment frame having a cathode, and the peripheral portion of the cation exchange membrane is clamped between the anode compartment frame and the cathode compartment frame so that the second layer faces to the cathode side and that the membrane surface is disposed vertically, and wherein the cation exchange membrane is attached so that one side of the cation exchange membrane having an attachment region becomes the upper side of the electrolytic cell.

The electrolytic cell of the present invention is preferably one wherein the cation exchange membrane is attached so that the inner edge of the attachment region is present toward the main region from the inner edge of a portion to be clamped by the compartment frames along a side of the cation exchange membrane having the attachment region. The electrolytic cell is more preferably an electrolytic cell wherein the cation exchange membrane is attached so that the inner edge of the attachment region is present 15 to 150 mm toward the main region from the inner edge of the portion to be clamped by the compartment frames.

The electrolytic cell of the present invention may be of a monopolar type wherein an anode compartment frame and a cathode compartment frame are separated to be independent, or of a bipolar type wherein back surfaces of the anode compartment frame and the cathode compartment frame are bonded. Regardless of whether the electrolytic cell of the present invention is of a monopolar type or a bipolar type, the construction may be a construction similar to a common monopolar type or bipolar type electrolytic cell except that the cation exchange membrane of the present invention is disposed at the above-described position as a cation exchange membrane.

Figure 7:
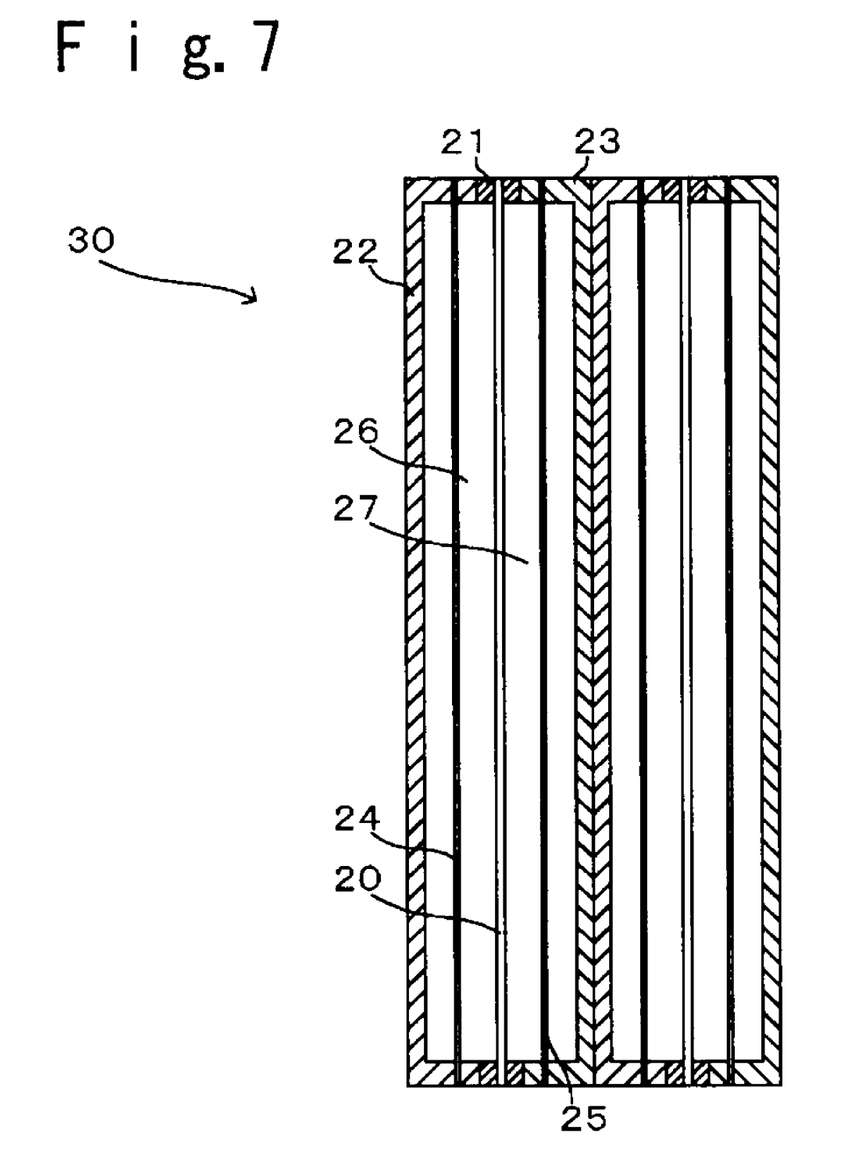
FIG. 7 is a view showing an embodiment of the electrolytic cell (monopolar type) of the present invention.

FIG. 7 shows an embodiment of the electrolytic cell of the present invention. In an electrolytic cell 30, the cation exchange membrane 20 of the present invention described above is attached between an anode chamber frame 22 to which an anode 24 is attached and a cathode compartment frame 23 to which a cathode 25 is attached, via gaskets 21. In the electrolytic cell 30, an anode compartment 26 is defined by the anode compartment frame 22 and the cation exchange membrane 20, and a cathode compartment 27 is defined by the cathode compartment frame 23 and the cation exchange membrane 20.

Here, the cation exchange membrane 20 of the present invention is attached by being clamped between the anode compartment frame 22 and the cathode compartment frame 23 via gaskets 21 so that the second layer being one of layers constituting the membrane and containing the fluoropolymer having carboxylic groups is disposed on the cathode side.

Here, in the case of employing the cation exchange membrane of the first embodiment having the attachment region along the upper side as the cation exchange membrane of the present invention, the cation exchange membrane is preferably attached so that the attachment region covers to a position 15 to 150 mm from the inner edge of a portion to be clamped by the compartment frames (that is clamping portion) toward the inside of the electrolytic cell (main region side of membrane) in the upper portion of the electrolytic cell. Further, also in a case of employing the cation exchange membrane of the second embodiment of the present invention having attachment regions along two sides, the cation exchange membrane is preferably attached so that in each of the upper portion and lower portion of the electrolytic cell, the attachment region covers to a position 15 to 150 mm from the inner edge of the clamping portion toward the inside of the electrolytic cell (main region side of membrane). Further, in each of the above cases, the position of the inner edge of the attachment region is preferably at a position 20 to 100 mm from the inner edge of the clamping portion toward the inside of the electrolytic cell (main region side of membrane).

By making the electrolytic cell of the present invention have such a construction, it is possible to obtain an electrolytic cell which can carry out electrolysis with good production efficiency, and which can suppress deterioration of the strength of the cation exchange membrane in the upper portion of the electrolytic cell or both upper and lower portions of the electrolytic cell in a long term use.

In the electrolytic cell of the present invention, using the above construction as one unit, a plurality of such units are arranged to constitute a construction similar to those of common electrolytic cells, and FIG. 7 shows an electrolytic cell wherein two such units are arranged. Here, for example, when the electrolytic cell is an electrolytic cell for alkali chloride, an alkali chloride aqueous solution is supplied to the anode compartment 26 and water is supplied to the cathode compartment 27 to carry out electrolysis.

Members other than the cation exchange membrane in the electrolytic cell of the present invention may be the same as those employed in common electrolytic cells in the construction. Specifically, the material constituting the anode compartment frame is preferably a material having a durability against alkali chloride and chlorine when the electrolytic cell of the present invention is employed for alkali chloride electrolysis. Such a material may be titanium etc. Further, when the electrolytic cell is employed for this purpose, the material constituting the cathode compartment is preferably a material having a durability against alkali hydroxide and hydrogen. Such a material may be a stainless steel, nickel, etc.

Further, as the anode, a mesh-shaped plate made of titanium or titanium coated with a metal oxide is preferably employed. As the cathode, a mesh-shaped plate made of a stainless steel, nickel or a metal coated with a nickel compound is preferably employed. Further, at a time of arranging electrodes, the cathode may be disposed so as to contact with the cation exchange membrane or it may be disposed so as to have an appropriate gap between the cathode and the cation exchange membrane.

In a case of carrying out electrolysis employing the electrolytic cell of the present invention, the electrolysis may be carried out under conventionally known conditions. Specifically, in a case of carrying out alkali chloride electrolysis, for example, while a sodium chloride aqueous solution or a potassium chloride aqueous solution is supplied to the anode compartment and water is supplied to the cathode compartment, the electrolytic cell is operated at a temperature of from 50 to 120° C. and an electric current density of from 1 to 6 kA/m$^2$ to produce a sodium hydroxide aqueous solution or a potassium hydroxide aqueous solution having a concentration from 20 to 40 mass %.

EXAMPLES

Now, the present invention will be specifically described with reference to Examples, but the present invention is not limited to these Examples.

Example $CF_2$=$CF_2$ (ratio in copolymer A: 88.2 mol %) and $CF_2$=$CFO(CF_2)COOCH_3$ (ratio in copolymer A: 11.8 mol %) were copolymerized to prepare a copolymer A having a carboxylic precursor having an ion exchange capacity of 0.95 meq/g dry resin as a functional group; and $CF_2$=$CF_2$ (ratio in copolymer B: 84.7 mol %) and $CF_2$=$CFOCF_2CF(CF_3)OCF_2CF_2SO_2F$ (ratio in copolymer B: 15.3 mol %) were copolymerized to prepare a copolymer B having a sulfonic precursor as a functional group and having an ion exchange capacity of 1.0 meq/g dry resin.

Next, by using a T-type coextrusion die having an extrusion width of 1,800 mm shown in FIGS. 5 and 6, the above copolymer A and copolymer B were coextrusion-molded. First, the temperature of the T-type coextrusion die was set to be 250° C. so that the film thickness distribution became constant in the width direction. Thereafter, temperatures of nine heaters on the copolymer A side of the dies were set so that readings of nine thermocouples disposed at 200 mm pitch in the width direction of the copolymer A side block became 265° C., 265° C., 245° C., 245° C., 245° C., 245° C., 245° C., 265° C., 265° C. in this order from a side edge. In the same manner, the temperatures of nine heaters on the copolymer B side were set so that readings of nine thermocouples disposed at 200 mm pitch in the width direction in the copolymer B side block became all 250° C.

The copolymer A was supplied from an extruder of 35 mmϕ to the T-type coextrusion die at a rate of 8 kg/hr, and the copolymer B was supplied from an extruder of 65 mmϕ to the T-type coextrusion dies at a rate of 32 kg/hr, to obtain a laminated film having a total thickness of 80 μm and a width of 1,600 mm. In the laminated film obtained, the thickness of the copolymer A (fluoropolymer having carboxylic precursor groups) layer at every 200 mm from the edge were 22 μm (0 mm from the edge), 22 μm (200 mm from the edge), 16 μm (400 mm from the edge), 12 μm (600 mm from the edge), 12 μm (800 mm from the edge), 12 μm (1,000 mm from the edge), 16 μm (1,200 mm from the edge), 22 μm (1,400 mm from the edge) and 22 μm (1,600 mm from the edge).

Between the film of copolymer B having a thickness of 30 μm molded by a single layer die and the copolymer B side of the above-obtained laminated film, a fabric cloth produced by weaving a PTFE yarn of 100 De at 27 strings/inch was sandwiched, and a hot roll-press (180° C., 40 kg/cm, 40 cm/min) was carried out to obtain a film reinforced by the woven cloth.

This film was immersed in a solution of dimethylsulfoxide/potassium hydroxide/water=30/15/55 weight ratio at 95° C.

for 30 minutes to convert the carboxylic precursor group and the sulfonic precursor group into a potassium carboxylate salt and a potassium sulfonate salt, respectively, and the film was rinsed with water and dried to obtain a cation exchange membrane. A solution prepared by mixing zirconium oxide having an average particle size of 1 μm and a 5 weight % ethanol solution of copolymer B with a weight ratio of ¼, was sprayed to be applied on both surfaces of the obtained film, and it was dried at 90° C. The film was further immersed in a 4 weight % sodium hydrogen carbonate aqueous solution, and rinsed by water to convert the applied material to a sodium salt type. The film after this treatment was cut into a size of 1,350 mm (vertical direction of electrolytic cell)×2, 520 mm (width (lateral) direction of electrolytic cell) to obtain an ion exchange membrane for electrolytic cell.

The cation exchange membrane obtained by the above process had at least two layers that were a first layer made of a fluoropolymer having sulfonic groups and a second layer made of a fluoropolymer having carboxylic groups that is laminated on the first layer, wherein the second layer had such a thickness distribution that the thickness was 22 μm over the entire width 175 mm in upper and lower portions and the thickness was 12 μm in the central portion between 375 mm and 975 mm from the upper end toward the inside.

The cation exchange membrane for electrolytic cell obtained in the above process was attached to a filter-press type electrolytic cell (manufactured by Asahi Glass Company, Limited, AEC-B1) having an effective area size of 1,200 mm×2,400 mm so that a region of the cation exchange membrane wherein the thickness of the second layer was 22 μm covered to a position 100 mm more inside of the electrolytic cell than the inner edge of a clamping portion in each of the upper and lower portions of the electrolytic cell, and electrolysis was carried out under the conditions that sodium hydroxide concentration was 32% brine concentration was 200 g/l, 85° C. and 4 kA/m².

Continuous operation of the above electrolytic cell for 200 days was carried out, and Table 1 shows the current efficiency (%), the cell voltage (V) and the salt (NaCl) concentration (ppm) in the sodium hydroxide at initial stage (7-th day) and 200-th day of the operation. Further, after 200 days of the operation, the electrolytic cell was disassembled to take out the cation exchange membrane, and with respect to a gasket portion of an upper portion of the electrolytic cell, the tensile elongation at 45° degree to the reinforcement cloth was measured according to JIS K6251. Table 1 also shows the results.

TABLE 1

|  | Initial | After 200 day operation |
|---|---|---|
| Current efficiency (%) | 96.5 | 96.5 |
| Cell voltage (V) | 2.92 | 2.92 |
| NaCl concentration (ppm) in sodium hydroxide | 12 | 12 |
| Tensile elongation (%) | 45 | 42 |

As apparent from Table 1, by carrying out salt electrolysis by employing the cation exchange membrane of this embodiment that is the cation exchange membrane of the present invention, cell voltages is low in a long term use, diffusion of salt into a product sodium hydroxide is little, and deterioration of the quality is little. Further, it is understandable that there is no deterioration of the cation exchange membrane in the upper portion of the electrolytic cell in the tensile elongation, and that the deterioration of the strength of the membrane is suppressed.

Comparative Example 1

Coextrusion molding was carried out in the same manner as the above example except that heater temperatures of nine blocks on the copolymer A (fluoropolymer having carboxylic precursor groups) side were all adjusted to 250° C. by monitoring respective nine thermocouples, and that the extrusion supply amount of the copolymer A in the coextrusion employing the 35 mmφ extruder was set to be 6 kg/hr. As a result, a co-extruded laminated film having a uniform total thickness of 80 μm wherein the thickness of the layer made of copolymer A (fluoropolymer having carboxylic precursor groups) was 12 μm, was obtained. To the obtained laminated film, lamination and treatment were carried out in the same manner as the Example to obtain a cation exchange membrane for electrolytic cell, and electrolysis test for 200 days was carried out in the same manner as the Example. Table 2 shows the results.

TABLE 2

|  | Initial | After 200 day operation |
|---|---|---|
| Current efficiency (%) | 96.5 | 95.5 |
| Cell voltage (V) | 2.92 | 2.92 |
| NaCl concentration (ppm) in sodium hydroxide | 16 | 50 |
| Tensile elongation (%) | 45 | 20 |

As apparent from Table 2, when salt electrolysis was carried out by using the cation exchange membrane of Comparative Example 1 wherein the thickness of the layer of fluoropolymer having carboxylic groups is small and constant in the width direction, there was no problem in the cell voltage that remained low in a long term use, but there was a problem that diffusion of salt into product sodium hydroxide occurred and the quality of the product was deteriorated. Further, the tensile elongation of the cation ion exchange membrane in the upper portion of the electrolytic cell decreased, which means that deterioration of the strength of the membrane occurred.

Comparative Example 2

Coextrusion molding was carried out in the same manner as the above example except that heater temperatures of nine blocks on the copolymer A (fluoropolymer having carboxylic precursor groups) side were all adjusted to 250° C. by monitoring respective nine thermocouples, and that the extrusion supply amount of the copolymer A in the coextrusion employing the 35 mmφ extruder was set to be 9 kg/hr. As a result, a co-extruded laminated film having a uniform total thickness of 80 μm wherein the thickness of the layer made of copolymer A (fluoropolymer having carboxylic precursor groups) was 18 μm, was obtained. To the obtained laminated film, lamination and treatment were carried out in the same manner as the Example to obtain a cation exchange membrane for electrolytic cell, and electrolysis test for 200 days was carried out in the same manner as the Example. Table 3 shows the results.

TABLE 3

|  | Initial | After 200 day operation |
|---|---|---|
| Current efficiency (%) | 96.5 | 96.5 |
| Cell voltage (V) | 2.95 | 2.95 |
| NaCl concentration (ppm) in sodium hydroxide | 10 | 10 |
| Tensile elongation (%) | 45 | 42 |

As apparent from Table 3, when salt electrolysis was carried out by using the cation exchange membrane of Comparative Example 2 wherein the thickness of the layer of fluoropolymer having carboxylic groups is large and constant in the width direction, little diffusion of salt into product sodium hydroxide occurred in a long term use, and little deterioration of the quality occurred. Further, the tensile elongation of the cation exchange membrane in the upper portion of the electrolytic cell did not decrease and deterioration of the strength of the membrane was suppressed. However, the cell voltage was higher than that of the Example from the initial stage, which is problematic in terms of running cost. Here, in the Example and Comparative Examples, the term electrolytic voltage means a measured voltage of entire electrolytic cell, but the voltage drop by the membrane alone on the actual electrolysis surface was 0.17 V in Example and 0.2 V in Comparative Example 2, and the voltage drop in Comparative Example 2 was by at least 10% higher than that of Example. Accordingly, the difference was significant.

INDUSTRIAL APPLICABILITY

The cation exchange membrane and the electrolytic cell of the present invention can be employed in e.g. a process for electrolyzing an alkali chloride aqueous solution to produce an alkali hydroxide.

This application is a continuation of PCT Application No. PCT/JP2010/052649, filed on Feb. 22, 2010, which is based upon and claims the benefit of priority from Japanese Patent Application No. 2009-039147 filed on Feb. 23, 2009. The contents of those applications are incorporated herein by reference in its entirety.

REFERENCE SYMBOLS

1 . . . Two layer structure of cation exchange membrane, 2 . . . first layer, 3 . . . second layer, 4 . . . one side of rectangular cation exchange membrane,
5 . . . side opposed to side 4,
1' . . . laminated film, 2' . . . sulfonic precursor layer, 3' . . . carboxylic precursor layer, 10 . . . T-type coextrusion die, 11 . . . sulfonic precursor group-containing polymer supply pipe,
12 . . . carboxylic precursor group-containing polymer supply pipe,
13 . . . sulfonic precursor group-containing polymer heater,
14 . . . carboxylic precursor group-containing polymer heater,
15 . . . sulfonic precursor group-containing polymer thermocouple
16 . . . carboxylic precursor group-containing polymer thermocouple,
30 . . . electrolytic cell, 20 . . . cation exchange membrane, 21 . . . gasket, 22 . . . anode compartment frame,
23 . . . cathode compartment frame, 24 . . . anode, 25 . . . cathode, 26 . . . anode compartment, 27 . . . cathode compartment

What is claimed is:

1. A cation exchange membrane to be used for an electrolytic cell, which has a laminate structure comprising a first layer containing a fluoropolymer having sulfonic groups and a second layer containing a fluoropolymer having carboxylic groups and adjacent to the first layer, and which has a rectangular shape with a constant thickness;

wherein the cation exchange membrane has an attachment region along one or each of opposed sides of the cation exchange membrane and a main region other than the attachment region, or the cation exchange membrane further has a boundary region between the attachment region and the main region;

the value of the ratio (the thickness of the second layer)/(the total thickness of the first and second layers) in the attachment region is larger than the value of the ratio in the main region; and when the cation exchange membrane has the boundary region, the boundary region is a region wherein the value of the ratio changes from the attachment region toward the main region.

2. The cation exchange membrane according to claim 1, which has the attachment region along one side of the cation exchange membrane.

3. The cation exchange membrane according to claim 2, which has the boundary region.

4. The cation exchange membrane according to claim 1, which has the attachment region along each of opposed sides of the cation exchange membrane.

5. The cation exchange membrane according to claim 4, which has the boundary region along at least one side of the cation exchange membrane.

6. The cation exchange membrane according to claim 1, wherein the thickness of the second layer in the attachment region is at least 120% of the thickness of the second layer in the main region.

7. The cation exchange membrane according to claim 1, wherein the thickness of the second layer in the main region is from 5 to 18 μm.

8. The cation exchange membrane according to claim 1, wherein the thickness of the second layer in the attachment region is from 120 to 400% of the thickness of the second layer in the main region, and is from 18 to 30 μm.

9. An electrolytic cell comprising an anode compartment frame having an anode, a cathode compartment frame having a cathode and the cation exchange membrane as defined in claim 1, wherein the cation exchange membrane is attached by clamping the peripheral portion of the cation exchange membrane between the anode compartment frame and the cathode compartment frame so that the second layer of the cation exchange membrane faces to the cathode side and the membrane surface is vertically disposed, and so that one side of the cation exchange membrane along which the attachment region is provided is disposed along the upper end of the electrolytic cell.

10. The electrolytic cell according to claim 9, wherein in a side portion of the cation exchange membrane having the attachment region, the inner edge of the attachment region is located toward the main region from the inner edge of a portion to be clamped by the compartment frame.

11. The electrolytic cell according to claim 10, wherein the inner edge of the attachment region is located by 15 to 150 mm toward the main region from the inner edge of the portion to be clamped by the compartment frame.

12. A process for producing a cation exchange membrane comprising:

co-extrusion molding a fluoropolymer having precursor groups of sulfonic groups and a fluoropolymer having precursor groups of carboxylic groups, to produce a laminated film constituted by two layers that are respective layers of the fluoropolymers, the laminated film having a constant thickness along the extrusion width direction, the thickness of the layer of the fluoropolymer having precursor groups of carboxylic groups at one or both ends along the extrusion width direction being larger than the thickness in regions other than the ends; and subsequently converting the precursor groups of the respective fluoropolymers of the obtained laminate film into sulfonic groups and carboxylic groups, respectively, to produce a laminated film having a layer containing fluoropolymer having sulfonic groups and a layer containing a fluoropolymer having carboxylic groups.

13. The process for producing a cation exchange membrane according to claim 12, wherein in the co-extrusion molding, the forming temperature of at least one fluoropolymer of the two types of fluoropolymers having respective precursor groups is controlled so that the temperature of the portion of the fluoropolymer having a larger thickness along the extrusion width direction becomes higher than the temperature of other portions, thereby to control the thickness of each layer along the width direction.

\* \* \* \* \*